T. D. STANLEY.
STEERING GEAR.
APPLICATION FILED OCT. 10, 1913.
1,142,377.
Patented June 8, 1915.
3 SHEETS—SHEET 3.
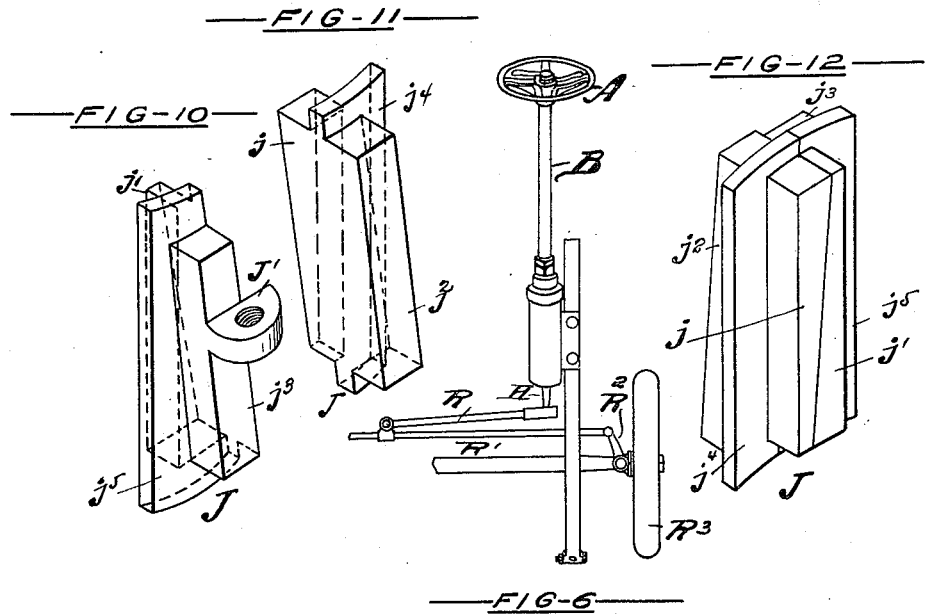
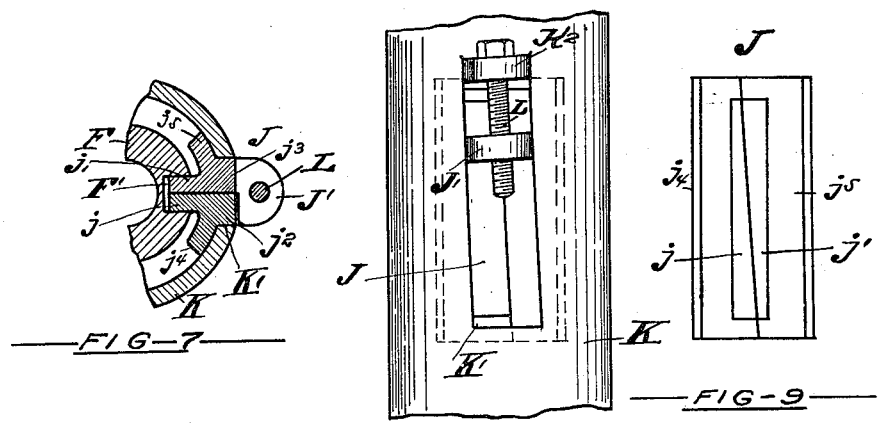

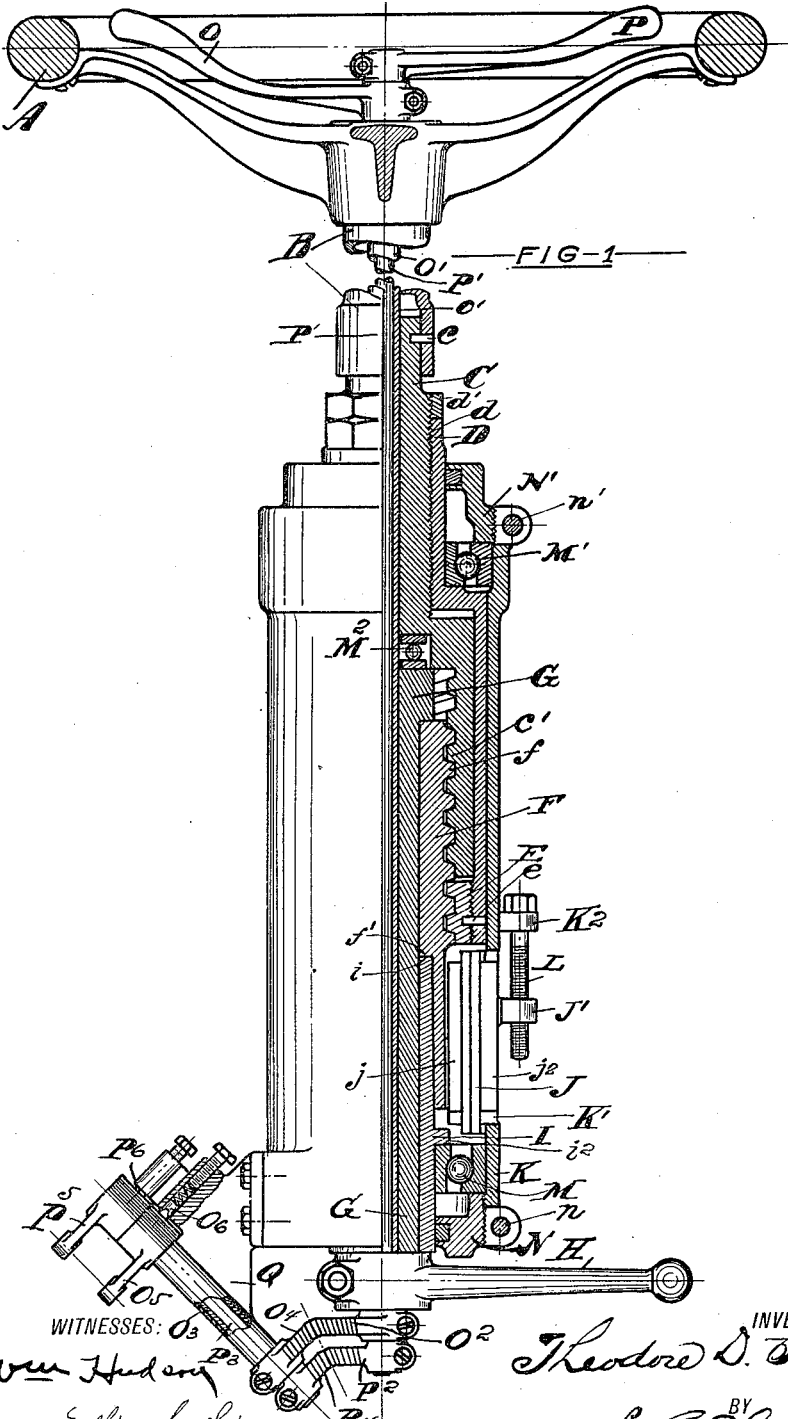

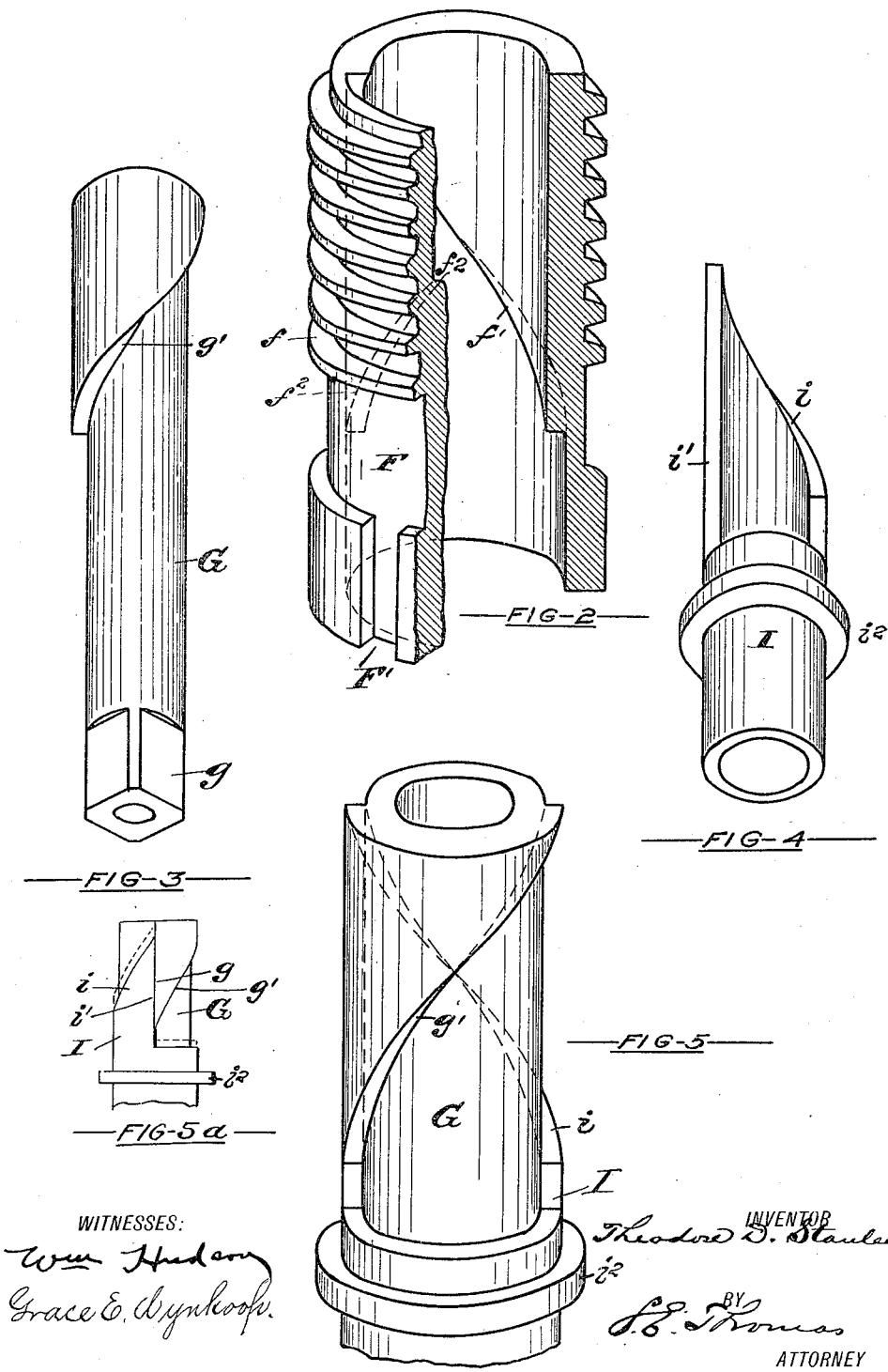

UNITED STATES PATENT OFFICE.

THEODORE D. STANLEY, OF DETROIT, MICHIGAN.

STEERING-GEAR.

1,142,377. Specification of Letters Patent. Patented June 8, 1915.

Application filed October 10, 1913. Serial No. 794,379.

*To all whom it may concern:*

Be it known that I, THEODORE D. STANLEY, citizen of the United States, residing at Detroit, county of Wayne, State of Michigan, have invented a certain new and useful Improvement in Steering-Gears, and declare the following to be a full, clear, and exact description of the same, such as will enable others skilled in the art to which it pertains to make and use the same, reference being had to the accompanying drawings, which form a part of this specification.

My invention relates to steering gears for automobiles shown in the accompanying drawings and more particularly set forth in the following specification and claims.

One of the objects of my invention is to produce an efficient and durable steering gear,—the construction being such that a relatively long bearing surface is provided between the working parts that the wear incident to its use may be reduced to the minimum.

Another feature of the invention consists in providing a constantly applied leverage through the medium of relatively long co-acting cams concentrically arranged and housed within the sleeve of the steering post.

Another feature of the invention consists in providing means adapted for a full adjustment of the several elements to take up wear between co-acting parts.

Another feature consists in the relative gain in strength, rigidity and durability by concentrically assembling the several working parts in such a manner as to provide a substantially solid unit.

Another feature of the invention is the reduction of the relative number of parts over devices of like character now in use.

Other advantages and improvements will hereafter appear.

In the drawings accompanying this specification: Figure 1 is a partial elevation and longitudinal section of the steering gear. Fig. 2 is a perspective view, partially in section, of the reciprocating sleeve. Fig. 3 is a perspective view of the crank shaft. Fig. 4 is a perspective view of the cam sleeve. Fig. 5 is a fragmentary perspective view showing the parts indicated in Figs. 3 and 4, in assembled relation. Fig. 5$^a$ is a fragmentary side elevation on a relatively smaller scale, of the crank shaft and cam sleeve assembled showing the longitudinal shoulders of the crank shaft and sleeve in abutting relation and in dotted lines, the position of the cam when adjusted with respect to the crank shaft. Fig. 6 is a fragmentary plan view of a chassis with the steering gear and parts connecting it with the forward traction wheel. Fig. 7 is a fragmentary cross-sectional view through the steering gear. Fig. 8 is a fragmentary elevation of the case inclosing the steering gear, showing the adjustable key. Fig. 9 is an elevation of the inside of the adjustable key. Fig. 10 is a perspective view of one-half of the adjustable key. Fig. 11 is a perspective view of the other half of the key. Fig. 12 is a perspective view of the parts shown in Figs. 10 and 11 assembled as viewed from the side opposite that indicated in the figures referred to.

Referring to the letters of reference placed upon the drawings: A indicates the steering wheel; B denotes the steering wheel shaft; and C a fitting secured to the shaft B by a pin $c$ or other suitable connecting means.

D is an outer sleeve having a screw-threaded connection $d$ with the shaft fitting C.

$d'$ is a lock nut engaging the fitting C to insure a locking engagement between the latter and the outer sleeve D upon adjusting the sleeve to take up wear between the parts.

E denotes an annular ring having a screw-threaded engagement with the lower end of the sleeve D, being made practically integral with the sleeve by a pin $e$ or other suitable locking means to form a stop for a member C.

F indicates a reciprocating sleeve having an externally threaded portion $f$ adapted to co-act with an internally threaded portion $c'$ on the sleeve C, and the ring E respectively.

F' denotes keyways in the reciprocating sleeve F.

G is a crank shaft squared at $g$ to receive the crank arm H.

I is a sleeve mounted on the crank shaft G having a spiral cam $i$ co-acting with the spiral shoulder $f'$ formed on the inner face of the reciprocating sleeve F. That portion of the sleeve I formed with a spiral cam $i$, is semi-circular in form, one-half of the sleeve being cut away a portion of its length thereby providing a longitudinal shoulder $i'$ along the remaining semi-circular portion and when the sleeve is assembled upon the crank shaft G, the longitudinal shoulder $i'$ of the sleeve lies contiguous with the longitudinal shoulder $g$ of the crank shaft G (see Fig. 5$^a$),—the purpose being to effect the rotation of the crank shaft and sleeve as a single unit upon being operated. By adjusting the sleeve longitudinally upon the crank shaft—as will be hereafter more fully explained—the wear between the spiral cam and the co-acting spiral shoulders of the related parts may be readily taken up.

$g'$ is a spiral shoulder formed on the outer surface of the crank shaft G, designed to co-act with a like spiral shoulder $f^2$ on the inner face of the reciprocating sleeve F.

J denotes an adjustable and divided key having inwardly projecting wedge shaped lugs $j$ and $j'$ extending into the keyway F' in the reciprocating sleeve F.

$j^2$ and $j^3$ are outwardly projecting lugs of equal width throughout their length extending from the respective portions of the divided key J, through an inclined rectangular opening K' in the inclosing sleeve K.

$j^4$ and $j^5$ are arc-shaped aprons projecting laterally from the respective portions of the divided key, lying adjacent to and concentric with the inclosing sleeve and serving to seal the opening K', through which the parts $j^2$ and $j^3$ project, from the entry of dust.

J' indicates an ear integral with the adjustable portion of the divided lug adapted to receive an adjusting screw.

$K^2$ is an ear integral with the inclosing sleeve K, pierced for the passage of the adjusting screw L engaging the ear J'.

M indicates an annular ball bearing encircling the sleeve I and housed within the inclosing sleeve K.

$i^2$ is a projecting flange on the sleeve I against which the inner ring of the ball bearing M bears.

N indicates an adjustable collar encircling the cam sleeve I, having a screw-threaded engagement with the inclosing sleeve K, adapted to bear against the ball bearing M.

M' indicates an annular ball bearing encircling the outer sleeve D, housed within the inclosing sleeve K.

N' is an adjustable collar encircling the outer sleeve D and adapted to bear upon the ball bearing M'.

$M^2$ is a ball bearing between the shaft fitting C and the upper end of the crank shaft G.

O is a lever controlling the ignition, and O' its shaft.

P is the carbureter control lever, and P' is its shaft.

$O^2$ is a gear segment mounted on the lower end of the shaft O', and $P^2$ is a like gear segment mounted on the lower end of the shaft P'.

Q is a bracket secured to the lower end of the inclosing sleeve K, formed with a bearing to receive a pair of concentrically arranged shafts $O^3$ and $P^3$ carrying segmental gears $O^4$ and $P^4$ respectively in mesh with the gears $O^2$ and $P^2$.

$O^5$ is a crank arm on the shaft $O^3$, and $P^5$ is a crank arm on the shaft $P^3$.

$O^6$ is an adjustable detent carried by the bracket Q engaging a ratchet face (not shown) on the hub of the crank arm $O^5$, and $P^6$ is an adjustable detent carried by the bracket Q engaging a like ratchet face (not shown) on the hub of the crank arm $P^5$.

R indicates the link connection between the crank arm H, and the link bar R', which in turn engages the steering arm $R^2$ controlling the direction taken by the wheel $R^3$.

Having indicated the several parts by reference letters, the construction and operation of the device will be readily understood.

The steering gear is operated by turning the steering wheel A connected through its shaft B with the fitting C. The fitting C through its internally threaded portion $c'$ co-acts with the threaded portion $f$ on the surface of the reciprocating sleeve F. A rotary movement given to the fitting C through the steering wheel A, will move upward or downward the reciprocating sleeve F, the latter being held against rotation by the key J extending into the keyway F' of the reciprocating sleeve and into the inclined rectangular opening K' in the inclosing sleeve K. The upward movement of the reciprocating sleeve F gives a rotary movement to the crank shaft G through the spiral shoulder $g'$ on the crank shaft G engaging with the corresponding shoulder $f^2$ on the inner face of the reciprocating sleeve F, while a downward movement of the reciprocating sleeve F gives a rotary movement— in the opposite direction—to the sleeve I due to the spiral shoulder $f'$ on the inner face of the reciprocating sleeve engaging the cam $i$ on the end of the sleeve I,—whereupon as before explained, the longitudinal shoulder $i'$ of the sleeve I, abutting with the longitudinal shoulder $g$ of the crank shaft G, causes said shaft and the sleeve I to revolve as a single unit but in an opposite direction to that taken when the reciprocating sleeve F is moved upward through the operation of the steering wheel.

A rotary movement of the crank shaft will give a turning movement to the fore running wheels of the vehicle through the link connection R between the crank arm H and the steering wheel. To compensate for any wear on the threads engaging the fitting C with the reciprocating sleeve F, the upper end of the fitting C is adjusted through its threaded connection with the outer sleeve D and secured by means of the lock nut $d'$. Thus by adjusting the fitting C upward or downward as required and securing it in the manner indicated, any slack due to wear of both when engaged with the reciprocating sleeve F, may be taken up. To compensate for wear on the spiral cams or shoulders of the respective co-acting parts the ball bearing M and M' are forced toward each other by the adjustable collars N and N', in turn secured against displacement by laterally extending bolts $n$, $n'$, respectively engaging a pair of ears projecting from each end of the inclosing sleeve K, which is divided longitudinally for a relatively short distance to provide for locking the collars by the adjustment of the bolts. The ball bearing M' by contact with the outer sleeve D, and through the latters connection with the fitting C, to the crank shaft G, will bring the bearing edges $f^2$ and $g'$ closer together by a downward movement of the ball bearing M'. The ball bearing M by its bearing against the projecting flange $i^2$ of the inner sleeve I, will bring the bearing edges $f'$ and $i$ together through an upward movement of the said ball bearing M. The inner sleeve I upon sliding along the crank shaft G through the contact of the respective longitudinal shoulders $i'$ and $g$, will impart to the crank shaft G any pressure on the cam edges $f'$ of the reciprocating sleeve F to the cam edge $i$ of the inner cam sleeve I. As indicated in dotted lines in Fig. 5ª, the wear between the spiral cam $i$ and co-acting spiral shoulders may be taken up by an adjustment of the inner sleeve I upon the crank shaft G through the adjustment of the collars N and N', as previously explained. To take up any play due to wear between the wedge-shaped lugs $j$ and $j'$ of the key J and the keyway F' in the reciprocating sleeve, the screw L may be adjusted so as to shift the movable wedge-shaped lug $j'$ with reference to its fixed mate $j$, thereby increasing the breadth of the combined lugs entering the keyway and thus taking up any play between the parts, as will be readily understood.

Having thus described my invention, what I claim is:—

1. In a device of the character described, a steering shaft, a reciprocating sleeve means for operating the shaft, a fitting secured to the shaft adapted to actuate the reciprocating sleeve, the reciprocating sleeve being provided with internal spiral shoulders forming cams, a longitudinally adjustable rotatable sleeve extending into the reciprocating sleeve having a spiral cam-shaped end adapted to co-act with the spiral cams of the reciprocating sleeve, and a crank shaft provided with a crank arm which is sleeved within the rotatable sleeve—and having a spiral shaped shoulder or cam co-acting with one of the spiral cams of the reciprocating sleeve, the rotatable sleeve and crank shaft being adapted to rotate as a single unit through the rectilinear movement of the reciprocating sleeve.

2. In a device of the character described, a steering shaft, a fitting secured to the shaft having an internal threaded portion, an outer sleeve having a screw-threaded engagement with the fitting, a reciprocating sleeve provided with internal spiral shoulders or cams and externally threaded to co-act with the internally threaded portion of the fitting, a crank shaft fitted with a crank arm lodged within the reciprocating sleeve provided with a spiral shoulder or cam adapted to co-act with the spiral shoulder of the reciprocating sleeve, a sleeve mounted upon the crank shaft having a spiral cam co-acting with the spiral shoulder of the crank shaft and with the spiral shoulders of the reciprocating sleeve, said sleeve and crank shaft being adapted to rotate as a single unit through the operation of the reciprocating sleeve, a stationary inclosing sleeve, and a key projecting into a slot provided for its reception in the reciprocating sleeve and engaged by the stationary sleeve, whereby the reciprocating sleeve is held against rotation.

3. In a device of the character described, a steering shaft, a fitting secured to the shaft having an internal threaded portion, an outer sleeve having a screw-threaded engagement with the fitting, an annular adjustable ring engaging the outer sleeve below the fitting, a reciprocating sleeve provided with internal spiral shoulders and externally threaded to co-act with the internally threaded portion of the fitting, a crank shaft fitted with a crank arm lodged within the reciprocating sleeve provided with a spiral shoulder adapted to co-act with the spiral shoulder of the reciprocating sleeve, a sleeve mounted upon the crank shaft having a spiral cam co-acting with the spiral shoulder of the crank shaft and with the spiral shoulders of the reciprocating sleeve, said crank shaft and sleeve being adapted to rotate as a single unit and to be adjusted longitudinally with respect to each other, a stationary inclosing sleeve, and a key projecting into a slot provided for its reception in the reciprocating sleeve and engaged by the stationary inclosing sleeve, whereby the reciprocating sleeve is held against rotation.

4. In a device of the character described, a steering shaft, a fitting secured to the shaft having an internal threaded portion, an outer sleeve having a screw-threaded engagement with the fitting, an annular ring carried by the outer sleeve below the fitting internally threaded to correspond with the internal threaded portion of the fitting, a reciprocating sleeve provided with internal spiral shoulders and externally threaded to co-act with the internally threaded portion of the fitting and the annular ring, a crank shaft fitted with a crank arm lodged within the reciprocating sleeve provided with a spiral shoulder adapted to co-act with the spiral shoulder of the reciprocating sleeve, a sleeve mounted upon the crank shaft having a spiral cam co-acting with the spiral shoulder of the crank shaft and with the spiral shoulders of the reciprocating sleeve, the crank shaft and last named sleeve each having abutting shoulders whereby they may be rotated as a single unit through the rectilinear movement of the reciprocating sleeve, a stationary inclosing sleeve, and a key projecting into a slot provided for its reception in the reciprocating sleeve and engaged by the stationary inclosing sleeve, whereby the reciprocating sleeve is held against rotation.

5. In a device of the character described, a steering shaft, a fitting secured to the shaft having an internal threaded portion, an outer sleeve adjustably engaged to the fitting, an annular ring engaged to the sleeve, internally threaded to correspond with the internal threaded portion of the fitting, a reciprocating sleeve externally threaded to co-act with the fitting and annular ring and having internal spiral shoulders, a crank shaft fitted with a crank arm having a spiral shoulder co-acting with the spiral shoulder of the sleeve and provided with a longitudinal shoulder, a sleeve mounted upon the crank shaft having a projecting semi-circular portion forming a longitudinal shoulder adapted to abut with the longitudinal shoulder of the sleeve whereby the sleeve and crank shaft may be rotated as a single unit, said sleeve also provided with a cam co-acting with the spiral shoulder of the reciprocating sleeve, a stationary inclosing sleeve, an adjustable key supported by the stationary sleeve extending into a keyway provided for its reception in the reciprocating sleeve, and means for regulating the degree of adjustment given to the key.

6. In a device of the character described, a crank shaft having a longitudinal shoulder formed thereon, a steering shaft, means for operating the shaft, a fitting secured to the shaft adapted to actuate a reciprocating sleeve, the reciprocating sleeve being provided with a keyway and with internal spiral shoulders forming cams, a longitudinally adjustable rotatable sleeve extending into the reciprocating sleeve having a spiral cam-shaped end adapted to co-act with the spiral shoulders of the reciprocating sleeve, said sleeve being cut away a portion of its length to form a longitudinal shoulder adapted to abut with the longitudinal shoulder of the crank shaft said crank shaft being disposed within the rotatable sleeve and also within the reciprocating sleeve said shaft being provided with a spiral-shaped shoulder or cam co-acting with one of the spiral shoulders or cams of the reciprocating sleeve and having a longitudinal shoulder adapted to abut with the longitudinal shoulder of the rotatable sleeve, whereby the rotatable sleeve and crank shaft may be rotated as a single unit through the rectilinear movement of the reciprocating sleeve, and means for adjusting said sleeve longitudinally and securing it against displacement when so adjusted.

7. In a device of the character described, a steering shaft, means for operating the shaft, a fitting secured to the shaft adapted to actuate a reciprocating sleeve, the reciprocating sleeve provided with a keyway, a rotatable sleeve extending into the reciprocating sleeve, a crank shaft sleeved within the rotatable sleeve and also within the reciprocating sleeve, the crank shaft and rotatable sleeve adapted to be rotated as a single unit by the rectilinear movement of the reciprocating sleeve, a stationary inclosing sleeve provided with a keyway, a divided key comprising two abutting wedge-shaped portions extending into the keyway of the reciprocating sleeve and two abutting rectangular portions extending into the keyway of the stationary inclosing sleeve, and means for adjusting the parts whereby the wedge-shaped portions may take up play incident to wear between the key and keyway of the reciprocating sleeve.

8. In a device of the character described, a steering shaft, means for operating the shaft, a fitting secured to the shaft adapted to actuate a reciprocating sleeve, the reciprocating sleeve being provided with a keyway, a rotatable sleeve extending into the reciprocating sleeve, a crank shaft sleeved within the rotatable sleeve and also within the reciprocating sleeve, the rotatable sleeve and crank shaft adapted to be rotated as a single unit by the rectilinear movement of the reciprocating sleeve, a stationary inclosing sleeve provided with a keyway, a longitudinally divided key comprising two abutting inwardly extending wedge-shaped portions projecting into the keyway of the reciprocating sleeve and two abutting outwardly extending rectangular portions projecting into the keyway of the stationary inclosing sleeve, each portion having also a projecting arc-shaped flange concentric to the stationary sleeve and lying adjacent to the inner wall of said last named sleeve to seal the slotted opening in the sleeve against the entry of dust, and means for adjusting the parts of said key to take up wear between the keyway and key.

9. In a device of the character described, a steering shaft, means for operating the shaft, a fitting secured to the shaft adapted to actuate a reciprocating sleeve, the reciprocating sleeve provided with a keyway, a rotatable sleeve extending into the reciprocating sleeve, a crank shaft sleeved within the rotatable sleeve and also within the reciprocating sleeve adapted to be rotated as a single unit by the rectilinear movement of the reciprocating sleeve, a stationary inclosing sleeve provided with a keyway, a longitudinally divided key comprising two inwardly extending wedge-shaped portions projecting into the keyway of the reciprocating sleeve and two abutting outwardly extending rectangular portions projecting into the keyway of the stationary inclosing sleeve, having projecting arc-shaped flanges concentric with the stationary sleeve and lying adjacent to the inner wall of said last named sleeve adapted to seal the slotted opening in the sleeve against the entry of dust, and an adjusting screw journaled in the inclosing sleeve adapted to regulate the adjustment of said key.

10. In a device of the character described, a steering shaft, a fitting secured to the shaft having an internal threaded portion, an outer sleeve adjustably engaged to the fitting, an annular ring engaged to the sleeve internally threaded to correspond with the internal threaded portion of the fitting, a reciprocating sleeve externally threaded to co-act with the fitting and annular ring having internal spiral shoulders, a crank shaft having a longitudinal shoulder and a spiral shoulder, the latter shoulder co-acting with the spiral shoulder of the sleeve, a longitudinally adjustable sleeve mounted upon the crank shaft having a semi-circular portion forming a longitudinal shoulder co-acting with the longitudinal shoulder of the crank shaft, whereby they may be rotated as a single unit, the end of the semi-circular portion of the sleeve forming a spiral-shaped cam coacting with the spiral shoulder of the reciprocating sleeve, a stationary inclosing sleeve, a pair of collars adjustably mounted in the inclosing sleeve, one of which is adapted to regulate the adjustment of the sleeve mounted directly upon the crank shaft, the other collar being adapted to regulate the adjustment of the sleeve adjustably engaged to the fitting secured to the steering shaft, and means for securing the collars against displacement when adjusted.

11. In a device of the character described, a steering shaft, a fitting secured to the shaft having an internally threaded portion, an outer sleeve adjustably engaged to the fitting provided with an internally threaded portion corresponding with the internally threaded portion of the fitting, a reciprocating sleeve adapted to actuate a crank shaft and externally threaded to co-act with the internally threaded portion of the fitting and also with the corresponding internally threaded portion of the outer sleeve, means for securing the reciprocating sleeve against rotation, a crank shaft, a sleeve mounted upon the crank shaft adapted to co-act with the crank shaft and the reciprocating sleeve whereby the crank shaft may be operated by a reciprocating movement of the sleeve, and a nut engaging the fitting, whereby upon the adjustment of the outer sleeve upon the fitting to take up wear between the internally threaded portions of the sleeve and fitting with the externally threaded portion of the reciprocating sleeve, said parts may be secured against accidental displacement.

12. In a device of the class described, a steering shaft, a fitting secured to the shaft, a sleeve secured to the fitting, a second sleeve mounted within the aforesaid sleeve and having rotative connection with the latter, a crank shaft mounted within the second mentioned sleeve, and means whereby the second mentioned sleeve and crank shaft may be rotated as a single unit in one direction under the action of said second mentioned sleeve.

13. In a device of the class described, a steering shaft, a fitting secured to the shaft and having an internal annular shoulder, a sleeve secured to said fitting, a second sleeve within the aforesaid sleeve and having rotative connection with said fitting, a third sleeve fitted within said second mentioned sleeve, a spiral cam connection between the said second and third sleeves, a crank shaft mounted within both the second and third sleeves and terminating at its inner end adjacent the aforesaid annular shoulder, and bearings between said annular shoulder and the inner end of said shaft.

14. In a device of the class described, a steering shaft, a fitting secured to the shaft and having an internal annular shoulder, a sleeve secured to said fitting, a second sleeve within the aforesaid sleeve and having rotative connection with said fitting, a third sleeve fitted within said second mentioned sleeve, a spiral cam connection between the said second and third sleeve, a crank shaft mounted within both the second and third sleeves and terminating at its inner end adjacent the aforesaid annular shoulder, bearings between said annular shoulder and the inner end of said shaft, and means whereby said third mentioned sleeve and the crank shaft may rotate as a single unit under the action of the second mentioned sleeve.

15. In a device of the class described, a steering shaft, a fitting secured to the shaft and having an enlarged diameter disposed in spaced relation to said steering shaft, a sleeve secured to said fitting and embracing the same, a second sleeve fitting within the enlarged diameter portion of said fitting and having rotative connection therewith, said second mentioned sleeve having an enlarged internal diameter portion, a third sleeve fitted within the enlarged internal diameter portion of the second sleeve, a cam connection between the second and third sleeves, and a crank shaft journaled in the second and third mentioned sleeves.

In testimony whereof, I sign this specification in the presence of two witnesses.

THEODORE D. STANLEY.

Witnesses:
GRACE E. WYNKOOP,
SAMUEL E. THOMAS.

Copies of this patent may be obtained for five cents each, by addressing the "Commissioner of Patents, Washington, D. C."